United States Patent
Okamura et al.

(10) Patent No.: US 11,400,833 B2
(45) Date of Patent: Aug. 2, 2022

(54) FUEL CELL VEHICLE AND LIQUID STATE ESTIMATION METHOD

(71) Applicant: HONDA MOTOR CO., LTD., Tokyo (JP)

(72) Inventors: Yuji Okamura, Wako (JP); Tetsuya Fukuda, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 43 days.

(21) Appl. No.: 16/864,182

(22) Filed: May 1, 2020

(65) Prior Publication Data

US 2020/0384892 A1  Dec. 10, 2020

(30) Foreign Application Priority Data

May 9, 2019 (JP) .............................. JP2019-088925

(51) Int. Cl.
 B60L 58/30 (2019.01)
 B60L 50/72 (2019.01)
 H01M 8/04119 (2016.01)

(52) U.S. Cl.
 CPC ............... B60L 58/30 (2019.02); B60L 50/72 (2019.02); H01M 8/04164 (2013.01); H01M 8/04179 (2013.01); H01M 2250/20 (2013.01)

(58) Field of Classification Search
 CPC ...... B60L 2240/16; B60L 50/70; B60L 50/72; B60L 58/30; H01M 2008/1095; H01M 2250/20; H01M 8/04164; H01M 8/04179; H01M 8/04514; H01M 8/04843
 See application file for complete search history.

(56) References Cited

U.S. PATENT DOCUMENTS

2009/0142633 A1* 6/2009 Kizaki .............. H01M 8/04492
 429/413
2015/0107198 A1* 4/2015 Yamaura ................... F16T 1/34
 55/385.3

FOREIGN PATENT DOCUMENTS

| JP | 2008-262735 | 10/2008 |
| JP | 2009-231073 | 10/2009 |
| JP | 2017-182944 | 10/2017 |

OTHER PUBLICATIONS

Japanese Office Action for Japanese Patent Application No. 2019-088925 dated Apr. 26, 2022.

* cited by examiner

Primary Examiner — Adam A Arciero (74) Attorney, Agent, or Firm — Amin, Turocy & Watson, LLP (57) ABSTRACT

A fuel cell vehicle is equipped with a fuel cell system including a gas liquid separation unit for separating gas and liquid and discharging the separated liquid. The fuel cell vehicle includes an acceleration sensor for detecting information regarding acceleration, and a control unit for estimating the discharge state of the liquid from the gas liquid separation unit based on the information regarding acceleration. Based on acceleration applied to the liquid in the gas liquid separation unit, the control unit can estimate whether the liquid is discharged from the gas liquid separation unit or the liquid is not discharged and remains as the remaining liquid in the gas liquid separation unit.

7 Claims, 7 Drawing Sheets

FUEL CELL VEHICLE AND LIQUID STATE ESTIMATION METHOD

CROSS-REFERENCE TO RELATED APPLICATION

This application is based upon and claims the benefit of priority from Japanese Patent Application No. 2019-088925 filed on May 9, 2019, the contents of which are incorporated herein by reference.

BACKGROUND OF THE INVENTION

Field of the Invention

The present invention relates to a fuel cell vehicle equipped with a fuel cell system, and a liquid state estimation method of estimating the discharge state of liquid from a gas liquid separation unit of the fuel cell system.

Description of the Related Art

A fuel cell vehicle (fuel cell automobile) is equipped with a gas liquid separator that separates liquid (water produced in power generation (hereinafter simply referred to as the produced water)) contained in reactant gases of a fuel cell system, from the reaction gases. For example, a gas liquid separator disclosed in Japanese Laid-Open Patent Publication No. 2009-231073 stores liquid on the lower side of a case, and discharges the liquid from an opening of a connection channel provided at a lower position of the case.

SUMMARY OF THE INVENTION

In this regard, the fuel cell vehicle is oriented in various directions during its travel, and acceleration is applied to the fuel cell vehicle from various directions depending on the travel conditions. Therefore, even if a purge valve is placed in the open state, the liquid stored in a gas liquid separation unit is affected by the orientation and acceleration of the vehicle, the liquid may move to a position remote from the opening, and may not be discharged from the gas liquid separation unit. For this reason, in general, the gas liquid separation unit is configured to store the remaining liquid until the next drainage timing, which results in increase in the size of the apparatus.

Further, it may be considered to detect the liquid in the gas liquid separation unit by a water level sensor, and open the purge valve again, if any liquid remains in the gas liquid separation unit, to perform drainage. However, in order to accurately detect the remaining liquid by the water level sensor, it is required to provide the water level sensor at each of a plurality of positions of the gas liquid separation unit. Consequently, for example, the degree of freedom in the design is constrained, sufficient reduction in the size is not achieved, and the production cost is pushed up disadvantageously.

The present invention has been made taking the above circumstances into account, and an object of the present invention is to provide a fuel cell vehicle and a liquid state estimation method which make it possible to suitably estimate the state of liquid in a gas liquid separation unit, and take a suitable measure accordingly.

In order to achieve the above object, according to a first aspect of the present invention, provided is a fuel cell vehicle equipped with a fuel cell system including a gas liquid separation unit configured to separate gas and liquid and discharge the separated liquid, the fuel cell vehicle including an acceleration detection unit configured to detect information regarding acceleration of the fuel cell vehicle, and a control unit configured to estimate a discharge state of the liquid from the gas liquid separation unit based on the information regarding acceleration.

Further, in order to achieve the above object, according to a second aspect of the present invention, provided is a liquid state estimation method for a fuel cell vehicle equipped with a fuel cell system including a gas liquid separation unit configured to separate gas and liquid and discharge the separated liquid, the method including the steps of obtaining, by a control unit, information regarding acceleration from an acceleration detection unit provided for the fuel cell vehicle, and estimating, by the control unit, a discharge state of the liquid from the gas liquid separation unit based on the information regarding acceleration.

In the fuel cell vehicle and the liquid state estimation method as described above, using the information regarding acceleration, since it is possible to ascertain the acceleration applied to the liquid inside the gas liquid separation unit, it is possible to suitably estimate that the liquid is discharged from the gas liquid separation unit, or the liquid is not discharged and remains as the remaining liquid in the gas liquid separation unit. Accordingly, in the case where the remaining liquid is produced in the gas liquid separation unit, it becomes possible to take a suitable measure, e.g., discharge this remaining liquid. In this manner, in the fuel cell vehicle, it is possible to reduce the volume of the portion of the gas liquid separation unit in which the liquid is stored, and achieve reduction in the size of the gas liquid separation unit. In addition, since it becomes unnecessary to provide a plurality of water level sensors, etc., the production cost can be reduced.

The above and other objects, features, and advantages of the present invention will become more apparent from the following description when taken in conjunction with the accompanying drawings in which a preferred embodiment of the present invention is shown by way of illustrative example.

DESCRIPTION OF THE PREFERRED EMBODIMENTS

Hereinafter, a preferred embodiment of the present invention will be described in detail with reference to the accompanying drawings.

Figure 1:
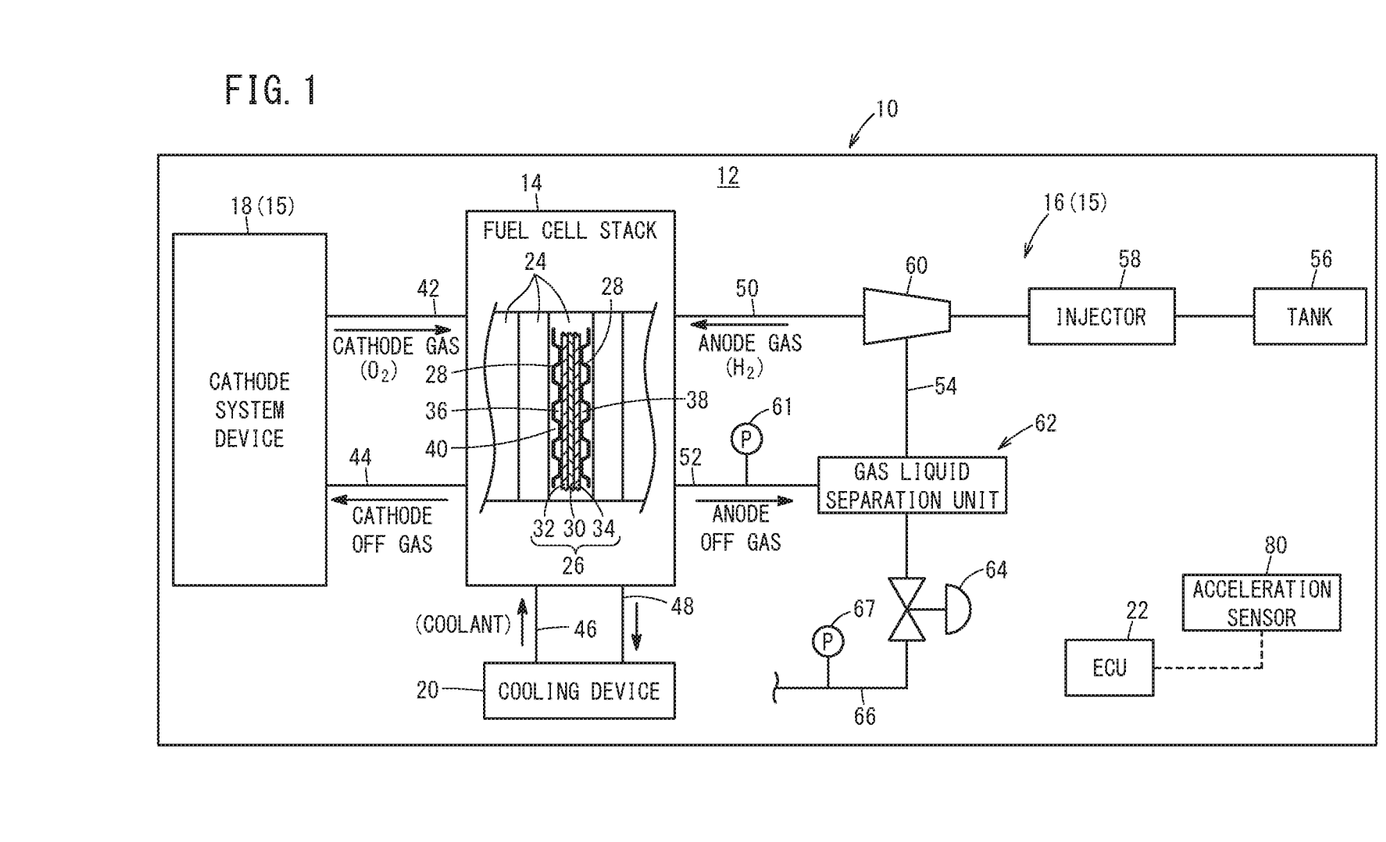
FIG. 1 is a block diagram schematically showing a fuel cell vehicle according to an embodiment of the present invention.

As shown in FIG. 1, a fuel cell vehicle 10 (fuel cell automobile: hereinafter, simply referred to as the vehicle 10) according to the embodiment of the present invention travels by rotary driving a power source such as a motor based on power generation of a fuel cell system 12. The fuel cell system 12 mounted in the vehicle 10 includes a fuel cell stack 14, reactant gas system devices 15 (an anode system device 16, a cathode system device 18), a cooling device 20, and a control unit 22 (ECU: Electronic Control unit).

The fuel cell stack 14 includes a plurality of power generation cells 24 which perform power generation by electrochemical reactions of an anode gas (fuel gas such as a hydrogen-containing gas) supplied from the anode system device 16, and a cathode gas (oxygen-containing gas such as the air) supplied from the cathode system device 18. The plurality of power generation cells 24 are stacked together in a vehicle width direction of the vehicle 10 such that electrode surfaces are oriented upright. It should be noted that the plurality of power generation cells 24 may be stacked together in a front/rear direction of the vehicle 10 or in the gravity direction.

Each of the power generation cells 24 includes a membrane electrode assembly 26 (hereinafter referred to as the "MEA 26"), and two separators 28 sandwiching the MEA 26. The MEA 26 includes an electrolyte membrane 30 (e.g., solid polymer electrolyte membrane (cation ion exchange membrane), an anode 32 provided on one surface of the electrolyte membrane 30, and a cathode 34 provided on the other surface of the electrolyte membrane 30. An anode flow field 36 is formed on a surface of one of the two separators 28 facing the anode 32, for allowing the anode gas to flow along the anode flow field 36. A cathode flow field 38 is formed on the other of the two separators 28 facing the cathode 34, for allowing the cathode gas to flow along the cathode flow field 38. Further, a coolant flow field 40 is formed between surfaces of the two separators 28 that face each other.

Further, the fuel cell stack 14 includes a plurality of fluid passages (not shown) for allowing the anode gas, the cathode gas, and the coolant to flow in the stacking direction of the power generation cells 24, toward the anode flow field 36, the cathode flow field 38, and the coolant flow field 40. The fluid passages are connected to pipes of the anode system device 16, the cathode system device 18, and the cooling device 20 connected to the fuel cell stack 14.

Pipes of the cathode system device 18 include a cathode supply pipe 42 for supplying the cathode gas to the fuel cell stack 14, and a cathode discharge pipe 44 for discharging the cathode off gas partially consumed in power generation of the fuel cell stack 14. Further, pipes of the coolant device 20 include a coolant supply pipe 46 for supplying a coolant to the fuel cell stack 14, and a coolant discharge pipe 48 for discharging the coolant from the fuel cell stack 14.

Pipes of the anode system device 16 include an anode supply pipe 50 for supplying the anode gas to the fuel cell stack 14, and an anode discharge pipe 52 for discharging the anode off gas partially consumed in power generation of the fuel cell stack 14. Further, a bypass pipe 54 is connected between the anode supply pipe 50 and the anode discharge pipe 52, for returning a hydrogen gas (anode gas) contained in the anode off gas in the anode discharge pipe 52 to the anode supply pipe 50.

As auxiliary devices for supplying the anode gas to the fuel cell stack 14, the anode system device 16 include a tank 56, an injector 58, and an ejector 60 that are arranged from the upstream side to the downstream side of the anode supply pipe 50. The tank 56 is connected to one end of the anode supply pipe 50, and supplies the stored anode gas (high pressure hydrogen gas) to the anode supply pipe 50. In the anode supply pipe 50, the injector 58 injects the anode gas on the upstream side toward the downstream side at a predetermined injection pressure. The ejector 60 sucks the anode gas from the bypass pipe 54, and supplies the anode gas to the fuel cell stack 14 on the downstream side, based on the flow of the anode gas injected from the injector 58.

Further, as auxiliary devices for discharging the anode off gas from the fuel cell stack 14, the anode discharge pipe 52 of the anode system device 16 is provided with a pressure sensor 61 and a gas liquid separation unit 62. Further, in the anode system device 16, the bypass pipe 54 is connected to the gas liquid separation unit 62, and a water discharge pipe 66 is connected to the gas liquid separation unit 62 through a purge valve 64. A pressure sensor 67 is provided for the water discharge pipe 66 (downstream of the purge valve 64).

For example, the gas liquid separation unit 62 is provided at one end of the fuel cell stack 14 in the vehicle width direction (one end of the power generation cells 24 in the stacking direction). It should be noted that the gas liquid separation unit 62 according to the embodiment of the present invention may be applied to another part of the anode system device 16, or the cathode system device 18 (reactant gas system device 15).

Figure 2A:
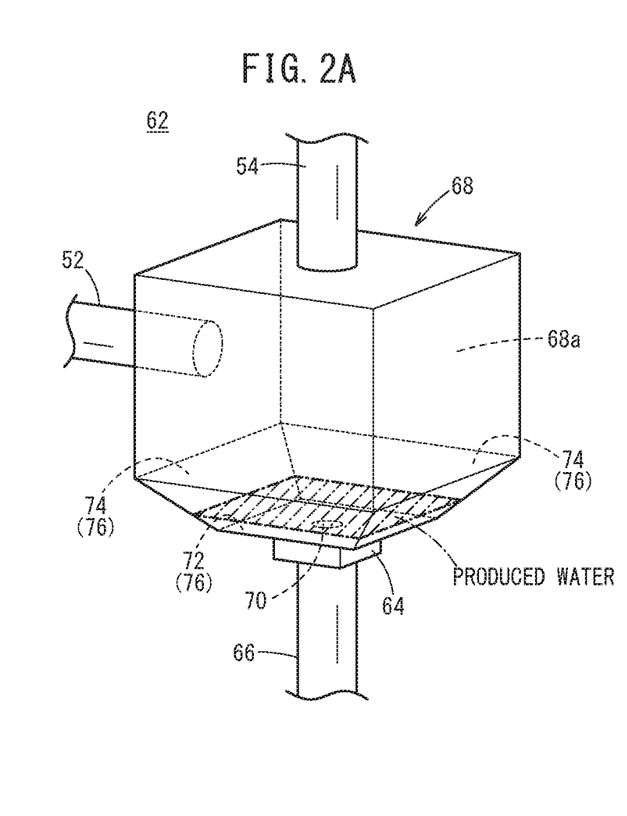
FIG. 2A is a perspective view schematically showing a state of a gas liquid separation unit when the gas liquid separation unit is oriented horizontally.

As shown in FIG. 2A, the gas liquid separation unit 62 includes a case 68 (structural body) having an internal space 68a. The gas liquid separation unit 62 separates, in the internal space 68a, unreacted hydrogen gas (gas) which has not been consumed in power generation and is contained in the anode off gas (fluid), and water (liquid) produced in power generation of the fuel cell stack 14. The case 68 may have, in the internal space 68a, a suitable separation structure for separating the hydrogen gas and the water produced in power generation while the anode off gas is flowing.

For example, the case 68 has a substantially rectangular parallelepiped shape, and has a side surface to which the anode discharge pipe 52 is connected, and an upper surface to which the bypass pipe 54 is connected. Further, the lower side of the case 68 is tapered downward in the gravity direction to have a conical shape. As an example, the lower side of the case 68 includes a flat surface 72 having an opening 70, and four tapered surfaces 74 inclined downward toward the flat surface 72. The purge valve 64 is attached to the flat surface 72. It should be noted that the shape of the case 68 is not limited. The case 68 may have various shapes.

The gas liquid separation unit 62 temporarily stores the produced water separated from the anode off gas in a space on the lower side of the case 68 (a storage space 76 formed by the flat surface 72 and the tapered surfaces 74). Then, when the purge valve 64 is in the closed state, the produced water is accumulated, and when the purge valve 64 is in the open state, the produced water is discharged into the water discharge pipe 66 through the opening 70.

Figure 2B:
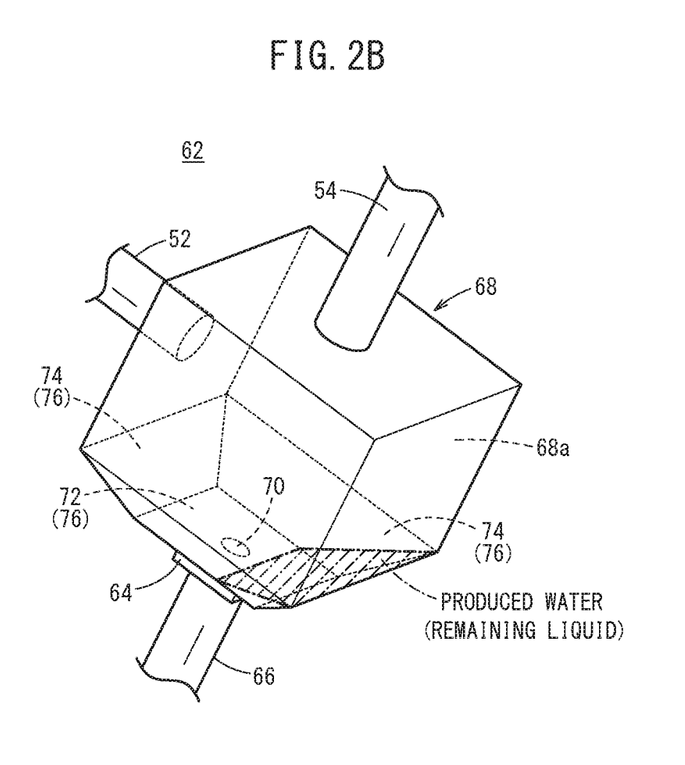
FIG. 2B is a perspective view schematically showing a state when the gas liquid separation unit is tilted.

In this regard, the position of the produced water stored in the internal space 68a (liquid storage position) in the case 68 changes depending on the state of the vehicle 10. For example, in the case where the vehicle 10 moves forward on an ascending slope (uphill slope), etc., the gas liquid separation unit 62 changes its orientation (is tilted) from the horizontal orientation (see FIG. 2A) to an orientation such that the upper side thereof is oriented backward and the lower side thereof is oriented forward as shown in FIG. 2B. As a result, the position of the produced water moves backward in the case 68 in comparison with the case where the gas liquid separation unit 62 is oriented in the horizontal direction.

Further, in the case where the change in the orientation of the gas liquid separation unit 62 is large, the produced water moves to the position remote from the opening 70. Therefore, even in the case where the purge valve 64 is placed in the open state, the produced water is not discharged through the opening 70, and remains in the case 68 as remaining liquid (remaining produced water). It should be noted that production of the remaining liquid in the gas liquid separation unit 62 is not limited to the case where the vehicle 10 moves on the uphill slope. Hereinafter, several conditions where the remaining liquid is produced will be described.

Figure 3A:
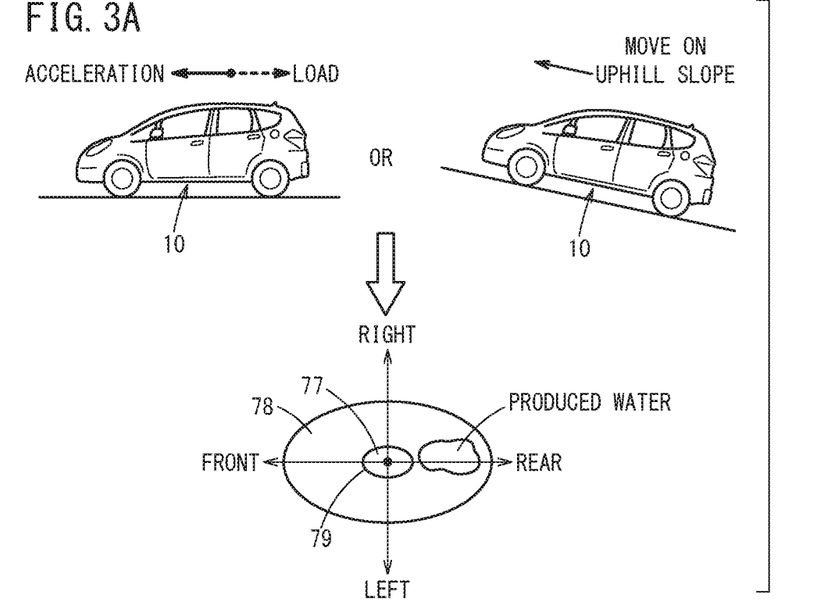
FIG. 3A is a view showing an example and a load model where water produced in power generation moves backward during travel of the fuel cell vehicle.

As shown in FIG. 3A, the conditions where the produced water moves backward in the case 68 include, in addition to moving on the uphill slope as described above, acceleration in the forward direction of the vehicle 10. That is, when the vehicle 10 is accelerated in the forward direction, a backward load (acceleration) is applied to objects and/or passengers in the vehicle 10. The water produced in the case 68 is applied with the backward load as well and moves backward. When acceleration is large, the produced water moves away from the opening 70. It is a matter of curse that the position of the produced water moves backward also in the conditions where, e.g., the vehicle 10 moves backward on a downhill slope, and the vehicle 10 is decelerated during backward movement.

When the position of the produced water in the case 68 during moving on the uphill slope or during acceleration in the forward direction is indicated by two dimensional coordinates (coordinates in a horizontal plane) in FIG. 3A as a load model, it can be said that the produced water moves backward from the center, due to application of the load (acceleration) to the produced water. It should be noted that the opening 70 is present at the center point where the front/rear axis and the left/right axis intersect with each other in the load model. The load model schematically shows relative movement of the produced water from the center point, based on the load applied to the produced water when the orientation of the case 68 changes or acceleration is applied to the produced water, regardless of the shape of the case 68. That is, the magnitude and the direction of the load applied to the produced water in the load model substantially match the position of the produced water in the case 68.

Further, in the load model, the range where the produced water can be discharged through the opening 70 even if the position of the produced water moves due to the load applied to the produced water when the orientation of the case 68 changes, or acceleration is applied to the produced water will be referred to as a discharge area 77. Conversely, in the load model, the range where the position of the produced water moves due to the load applied to the produced water when the orientation of the case 68 changes, or acceleration is applied to the produced water, and the produced water is not discharged through the opening 70 and remains as remaining liquid will be referred to as a remaining liquid area 78.

In the illustrated embodiment, a border 79 between the discharge area 77 and the remaining liquid area 78 is denoted by an oval, but may have a suitable shape depending on the shape, the installation position, and the installation orientation, etc. of the case 68 including the opening 70. However, the border 79 can be ascertained by conducting experiments beforehand, as to the degree of tilt of the case 68 at which the liquid cannot be discharged through the opening 70, or the degree of acceleration applied to the liquid in the case 68 at which the liquid cannot be discharged through the opening 70. Therefore, the control unit 22 holds information regarding the border 79, and compares this information regarding the border 79 and the load (acceleration) applied to the produced water to make it possible to estimate whether the position of the produced water is in the discharge area 77 or in the remaining liquid area 78.

Figure 3B:
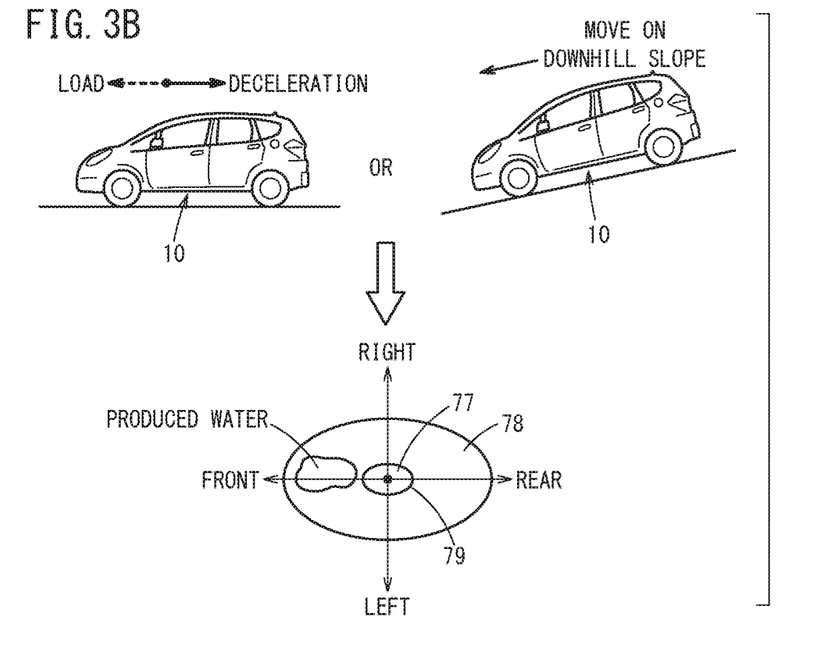
FIG. 3B is a view showing an example and a load model where the produced water moves forward during travel of the fuel cell vehicle.

Further, the conditions where the position of the produced water in the case 68 moves forward will be described with reference to FIG. 3B. The conditions where the position of the produced water moves forward include conditions where, e.g., the vehicle 10 is decelerated by applying the brake when the vehicle 10 move forward (minus acceleration is applied), and the vehicle 10 moves forward on a descending slope (downhill slope). Also in the case where the produced water moves forward, when the orientation of the case 68 changes and/or acceleration is applied to the produced water, if the load applied to the produced water is present in the discharge area 77, the produced water is discharged from the case 68, and if the load applied to the produced water is present in the remaining liquid area 78, the produced water remains in the case 68 as the remaining liquid (see the load model in the illustrated embodiment). It is a matter of course that the position of the produced water moves forward also in the conditions where, e.g., the vehicle moves backward on the uphill slope, and the vehicle 10 is accelerated when the vehicle 10 moves backward.

Figure 4A:
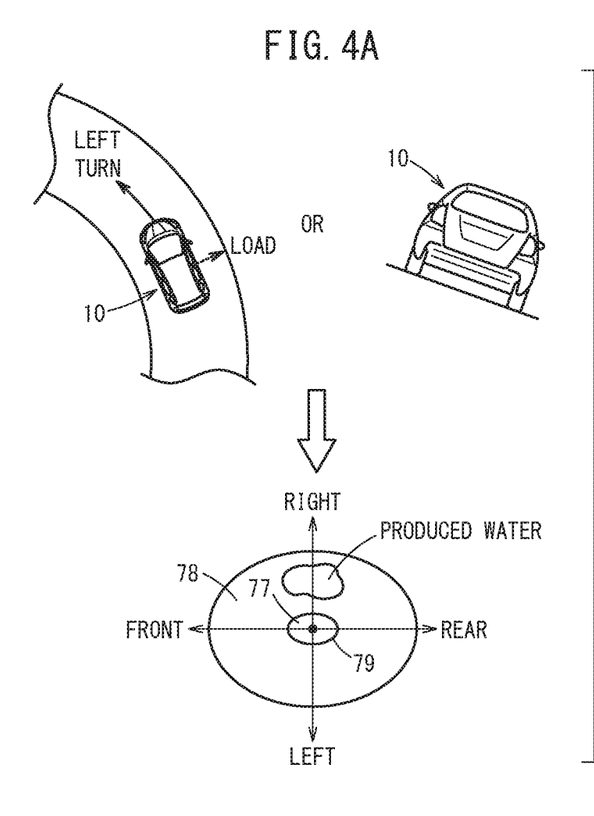
FIG. 4A is a view showing an example and a load model where the produced water moves to the right side during travel of the fuel cell vehicle.

Further, as shown in FIG. 4A, the produced water in the case 68 may move to the right side. The conditions where the produced water moves to the right side include conditions, e.g., where the vehicle 10 turns to the left (counter clockwise) to receive a lateral load (centrifugal force), and the vehicle 10 travels on a road such as a cant where the right side is low. Also in the case where the produced water moves to the right side, when the orientation of the case 68 changes and/or acceleration is applied to the produced water, if the load applied to the produced water is present in the discharge area 77, the produced water is discharged from the case 68, and if the load applied to the produced water is present in the remaining liquid area 78, the produced water remains in the case 68 as the remaining liquid (see the load model in the illustrated embodiment).

Figure 4B:
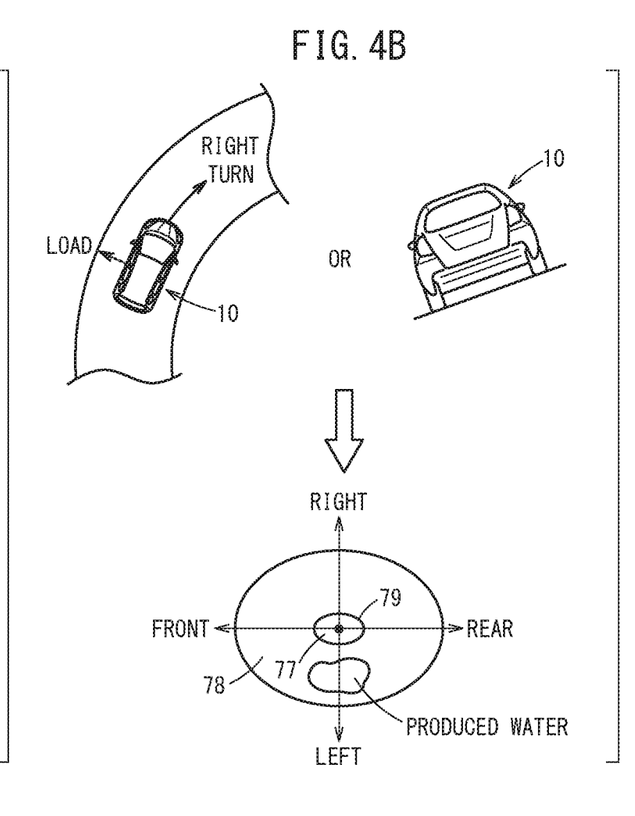
FIG. 4B is a view showing an example and a load model where the produced water moves to the left side during travel of the fuel cell vehicle.

Alternatively, as shown in FIG. 4B, the produced water in the case 68 may move to the left side. The conditions where the produced water moves to the left side include conditions, e.g., where the vehicle 10 turns to the right (clockwise) to receive a lateral load (centrifugal force), and the vehicle 10 travels on a road such as a cant where the left side is low. Also in the case where the produced water moves to the left side, when the orientation of the case 68 changes and/or acceleration is applied to the produced water, if the load applied to the produced water is present in the discharge area 77, the produced water is discharged from the case 68, and if the load applied to the produced water is present in the remaining liquid area 78, the produced water remains in the case 68 as the remaining liquid (see the load model in the illustrated embodiment).

Referring back to FIG. 1, the control unit 22 provided in the vehicle 10 is configured to estimate the liquid state (discharge of the produced water, presence/absence of the remaining liquid) of the gas liquid separation unit 62, and perform a suitable process. The control unit 22 is in the form of a computer including a processor, a memory, and an input/output interface (not shown). The control unit 22 may be provided as a dedicated ECU for monitoring the remaining liquid, or may be provided in a control device for controlling the fuel cell system 12, and a control device for controlling travel of the vehicle 10, etc.

The control unit 22 is connected to and communicates with the pressure sensors 61, 67, and an acceleration sensor 80 which is provided beforehand in the vehicle 10, and performs a process using detection signals received from the pressure sensors 61, 67 and/or the acceleration sensor 80. The acceleration sensor 80 detects each of accelerations in the three axis directions (front/rear axis, left/right axis, upper/lower axis) of the vehicle 10, and sends detection results for the respective axes (information regarding acceleration) as detection signals to the control unit 22. Those that are applicable to the vehicle 10 may be utilized as this type of the acceleration sensor 80. For example, a detector of a behavior stabilization device (not shown) provided in the vehicle 10 may be applicable. It is not essential for the control unit 22 to obtain acceleration information from the acceleration sensor 80. The control unit 22 may determine acceleration from parameters detected by another detection unit.

Figure 5:
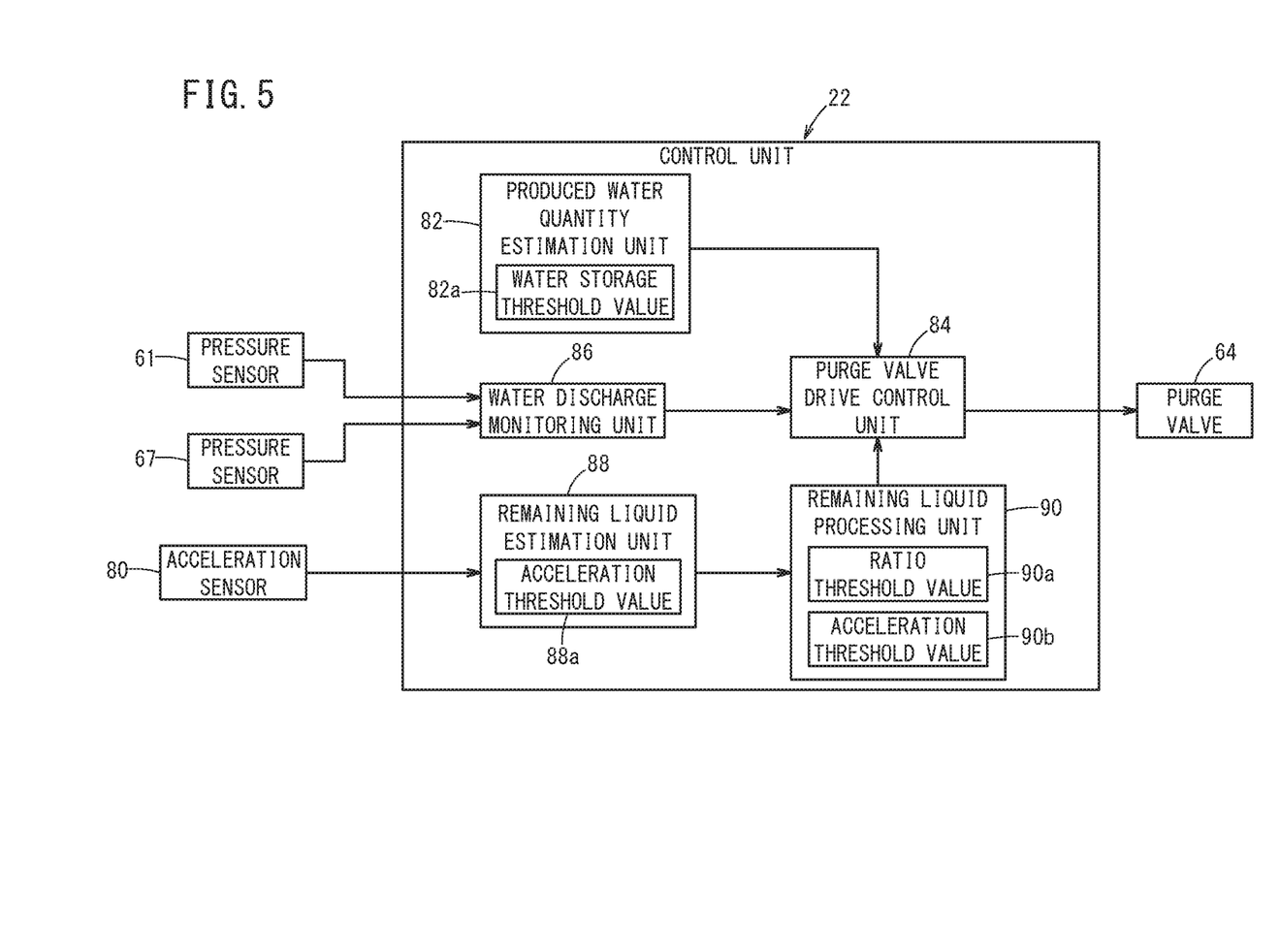
FIG. 5 is a block diagram showing functions of a control unit for performing a liquid state estimation method.

The processor of the control unit 22 reads and processes programs stored in the memory to estimate the liquid state of the gas liquid separation unit 62. Specifically, as shown in FIG. 5, a produced water quantity estimation unit 82, a purge valve drive control unit 84, a water discharge monitoring unit 86, a remaining liquid estimation unit 88, and a remaining liquid processing unit 90 are set up as function blocks inside the control unit 22.

The produced water quantity estimation unit 82 determines whether to discharge or stop discharging the produced water based on the quantity of the produced water (produced water quantity) produced in the anode system device 16 during power generation of the fuel cell stack 14. For example, the produced water quantity estimation unit 82 obtains the state quantity of the fuel cell system 12 (the quantity of the anode gas supplied from the anode system device 16, the quantity of power generation of the fuel cell stack 14, etc.), and applies the obtained state quantity to a predetermined formula to calculate the produced water quantity.

Further, the produced water quantity estimation unit 82 determines whether to discharge the produced water in the gas liquid separation unit 62 based on the calculated produced water quantity. The produced water quantity estimation unit 82 holds a water storage threshold value 82a in advance, and compares the calculated produced water quantity with the water storage threshold value 82a. If the produced water quantity is less than the water storage threshold value 82a, the produced water quantity estimation unit 82 determines to continue stopping the discharge of the produced water, and if the produced water quantity is not less than the water storage threshold value 82a, the produced water quantity estimation unit 82 determines to discharge the produced water. Then, if the produced water quantity estimation unit 82 determines to discharge the produced water, the produced water quantity estimation unit 82 outputs an opening instruction to the purge valve drive control unit 84.

The purge valve drive control unit 84 controls supply and stop of supply of power to the purge valve 64 to switch opening/closing of the purge valve 64. The purge valve 64 is placed in the closed state (the purge valve 64 is closed) in the power supply stop state, and is switched to the open state (the purge valve 64 is opened) based on the power supply of the purge valve drive control unit 84. As a result, the water (liquid) can be discharged from the gas liquid separation unit 62 through the purge valve 64.

Further, the purge valve drive control unit 84 measures an open time A by a timer unit (not shown) when the purge valve 64 is switched to the open state. It should be noted that the open state of the purge valve 64 may be established for a predetermined open setting period, and the purge valve drive control unit 84 may close the purge valve 64 when the open time A reaches the open setting period.

The water discharge monitoring unit 86 monitors the discharge state of the produced water or the hydrogen gas from the purge valve 64 based on pressure information (detection signals) detected by the pressure sensors 61, 67. That is, the water discharge monitoring unit 86 can identify whether the substance discharged from the purge valve 64 (gas liquid separation unit 62) is liquid or gas based on the differential pressure between pressure on the upstream side of the purge valve 64 and the pressure on the downstream side of the purge valve 64. It is because, if the differential pressure at the time of discharging liquid changes sharply, it can be regarded that the discharge state is changed to the discharge of gas. Since determination of the liquid and the gas based on the pressure of this type is known, specific description is omitted.

The water discharge monitoring unit 86 monitors the differential pressure based on, for example, the opening instruction from the produced water quantity estimation unit 82. Then, in the open state of the purge valve 64, when determining that the substance discharged from the gas liquid separation unit 62 is switched from the liquid to the gas, the water discharge monitoring unit 86 outputs a closing instruction to the purge valve drive control unit 84. Upon receiving this closing instruction, the purge valve drive control unit 84 places the purge valve 64 in the closed state.

The remaining liquid estimation unit 88 successively obtains detection signals from the acceleration sensor 80 of the vehicle 10 (information regarding acceleration) to calculate the vector of the load applied to the produced water in the case 68, and determines whether or not the remaining liquid is produced still more. Specifically, the remaining liquid estimation unit 88 calculates a resultant acceleration force of acceleration in the front/rear axis and acceleration in the left/right axis of the vehicle 10 included in the acceleration information from the acceleration sensor 80, and regards this resultant acceleration force as a load applied to the produced water (i.e., the position of the produced water). The resultant acceleration force can be calculated easily by determining the square root of the sum of the square of the acceleration in the front/rear axis and the square of the acceleration in the left/right axis.

Further, the remaining liquid estimation unit 88 holds, as information of the border 79 between the discharge area 77 and the remaining liquid area 78, an acceleration threshold value 88a which is determined in advance through experiments or the like. The remaining liquid estimation unit 88 compares the calculated resultant acceleration force with this acceleration threshold value 88a at the time of estimating the liquid state of the gas liquid separation unit 62. That is, if the resultant acceleration force is not less than the acceleration threshold value 88a, it can be said that the position (load) of the produced water is in the remaining liquid area 78, and the produced water is remaining liquid. Conversely, if the resultant acceleration force is less than the acceleration threshold value 88*a*, it can be said that the position (load) of the produced water is in the discharge area 77, and the produced water is discharged.

Further, when the position of the produced water is in the remaining liquid area 78, the remaining liquid estimation unit 88 counts the time (a remaining liquid time B) by a timer unit (not shown). This remaining liquid time B represents a time period during which the produced water is not discharged. Therefore, it can be regarded that the remaining liquid time B is roughly proportional to the quantity of the remaining liquid.

The remaining liquid processing unit 90 performs, as necessary, a process for the remaining liquid which is present in the gas liquid separation unit 62, based on the estimation result of the liquid state by the remaining liquid estimation unit 88. That is, if there is no remaining liquid or the quantity of the remaining liquid is small (if the quantity of the remaining liquid is acceptable to the gas liquid separation unit 62), there is no problem with the remaining liquid. Therefore, discharge of the remaining liquid from the gas liquid separation unit 62 is not performed. On the other hand, if the quantity of the remaining liquid is large, discharge of the remaining liquid from the gas liquid separation unit 62 is performed.

A process of discharging the remaining liquid (control to place the purge valve 64 in the open state) by the remaining liquid processing unit 90 is preferably performed in the case where a proportion C of the remaining liquid time B to the open time A has a predetermined value or more. In this manner, while the remaining liquid is discharged reliably, the power supply to the purge valve 64 and the leakage of the hydrogen gas are suppressed in the case where the discharge of the remaining liquid is not necessary. For this purpose, the remaining liquid processing unit 90 holds a ratio threshold value 90*a* for comparison with the proportion C.

Further, the remaining liquid processing unit 90 performs the process of discharging the remaining liquid when the position of the remaining liquid (load applied to the produced water when the orientation of the case 68 changes or acceleration is applied to the produced water) is positioned in the discharge area 77. For this purpose, the remaining liquid processing unit 90 has the function of calculating the resultant force based on the acceleration information obtained from the acceleration sensor 80, and has an acceleration threshold value 90*b* for comparison with the resultant acceleration force. The acceleration threshold value 90*b* may be the same as the acceleration threshold value 88*a* of the remaining liquid estimation unit 88, and may be smaller than the acceleration threshold value 88*a*. In this manner, under the condition where the remaining liquid is discharged reliably from the gas liquid separation unit 62, it is possible to discharge the remaining liquid.

The vehicle 10 according to the embodiment of the present invention basically has a structure as described above. Hereinafter, a method of estimating the liquid state by the control unit 22 will be described.

Figure 6:
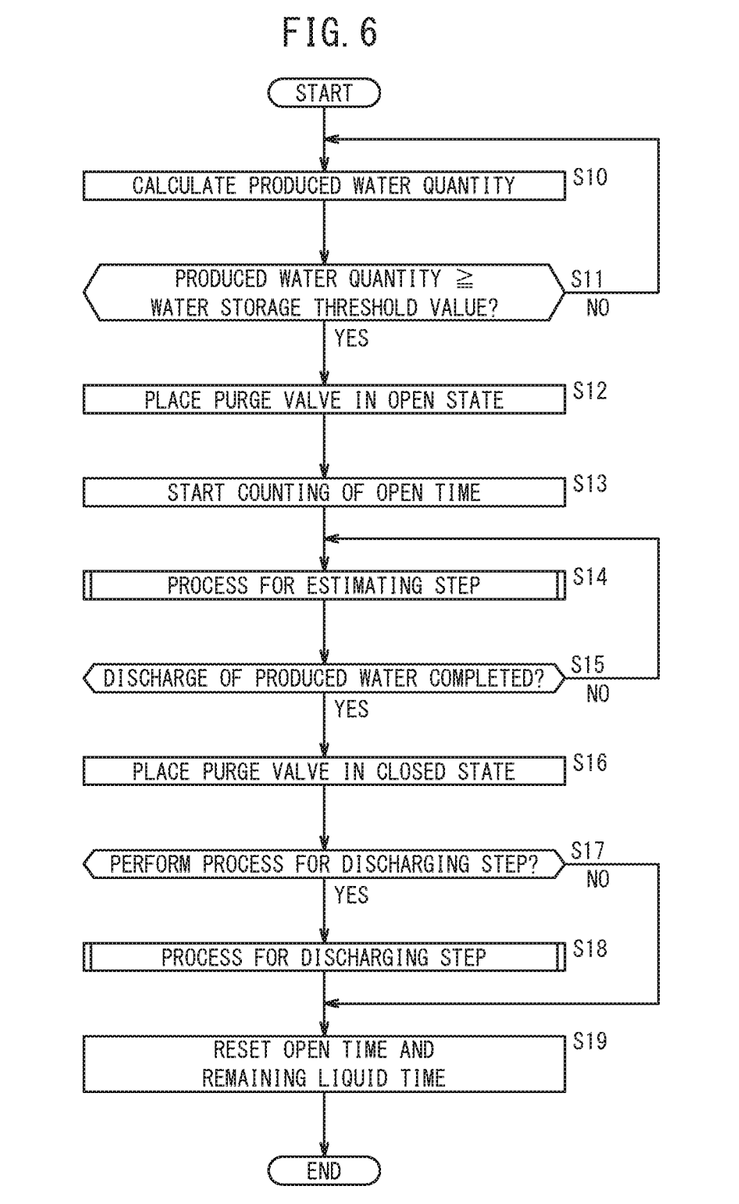
FIG. 6 is a flow chart showing processes in the liquid state estimation method according to the embodiment of the present invention.

The vehicle 10 starts traveling as operation of the fuel cell system 12 is started and power (electrical energy) is supplied from the fuel cell stack 14 to a motor (drive source) (not shown) to drive the motor. Further, as a result of start of travel of the vehicle 10, as shown in FIG. 6, the control unit 22 performs the process flow of the liquid state estimation method for the gas liquid separation unit 62.

In the liquid state estimation method, the control unit 22 calculates the quantity of produced water stored in the gas liquid separation unit 62 by the produced water quantity estimation unit 82 (step S10). Then, the produced water quantity estimation unit 82 determines whether or not the calculated produced water quantity is not less than the water storage threshold value 82*a* (step S11). In the case where the produced water quantity is less than the water storage threshold value 82*a* (step S11: NO), the routine returns to step S10 to continue monitoring of the produced water quantity. On the other hand, in the case where the produced water quantity is not less than the water storage threshold value 82*a* (step S11: YES), the routine proceeds to step S12.

In step S12, the produced water quantity estimation unit 82 outputs an opening instruction to the purge valve drive control unit 84 so that the purge valve drive control unit 84 switches the purge valve 64 from the closed state to the open state. Accordingly, the produced water stored in the gas liquid separation unit 62 can be discharged through the opening 70. Further, as a result of transition to the open state of the purge valve 64, the purge valve drive control unit 84 starts counting of the open time A during which the produced water is discharged (step S13). The control unit 22 performs a subroutine of the process for the estimating step by the remaining liquid estimation unit 88, while the purge valve 64 is in the open state (step S14).

Figure 7A:
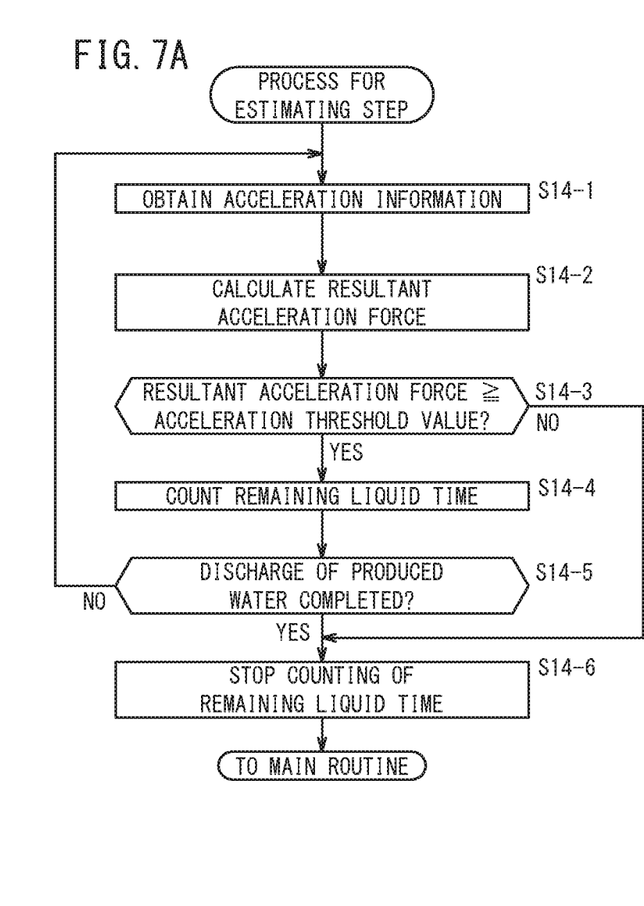
FIG. 7A is a flow chart showing the process for an estimating step in FIG. 6.

Specifically, as shown in FIG. 7A, in the process for the estimating step, firstly, the control unit 22 obtains the acceleration information from the acceleration sensor 80 (step S14-1: acquisition step). Then, the remaining liquid estimation unit 88 calculates a resultant acceleration force (position of the produced water) (step S14-2), and compares the calculated resultant acceleration force with the acceleration threshold value 88*a* held beforehand (step S14-3: estimating step). In the case where the resultant acceleration force is not less than the acceleration threshold value 88*a* (step S14-3: YES), the routine proceeds to step S14-4. In the case where the resultant acceleration force is less than the acceleration threshold value 88*a* (step S14-3: NO), the routine skips steps S14-4 and S14-5, and proceeds to step S14-6.

In step S14-4, the remaining liquid estimation unit 88 counts the remaining liquid time B during which the resultant acceleration force is not less than the acceleration threshold value 88*a*. Further, since the discharge of the produced water may be completed during the process for the estimating step, the differential pressure of the purge valve 64 is monitored by the water discharge monitoring unit 86 to determine whether or not the discharge of the produced water has been completed (step S14-5). Then, in the case where the discharge of the produced water has not been completed (step S14-5: NO), the routine returns to step S14-1 to repeat the above process flow. Thus, in the case where the resultant acceleration force is not less than the acceleration threshold value 88*a*, the process for the estimating step is continued, and the remaining liquid time B is accumulated.

On the other hand, in the case where the discharge of the produced water is completed (step S14-5: YES), the routine proceeds to step S14-6. In step S14-6, the remaining liquid estimation unit 88 stops counting of the remaining liquid time B. It should be noted that, in the case where the remaining liquid time B has not been counted, this step S14-6 is not performed. As a result, the subroutine of the process for the estimating step is finished.

Referring back to FIG. 6, after the process for the estimating step, the control unit 22 monitors the differential pressure of the purge valve 64 by the water discharge monitoring unit 86 to determine whether or not the discharge of the produced water has been completed (step S15). Then, if the discharge of the produced water has not been completed (step S15: NO), the routine returns to step S14 to perform the process for the estimating step again. On the other hand, if the discharge of the produced water has been completed (step S15: YES), the routine proceeds to step S16. It should be noted that, in the case where the process for the estimating step is finished based on the discharge completion of the produced water when the process for the estimating step is performed, this step S15 results in YES immediately.

In step S16, the water discharge monitoring unit 86 outputs a closing instruction to the purge valve drive control unit 84, and accordingly, the purge valve drive control unit 84 switches the purge valve 64 from the open state to the closed state.

Thereafter, the remaining liquid processing unit 90 determines whether to perform the process for the discharging step (step S17). That is, the remaining liquid processing unit 90 obtains the open time A and the remaining liquid time B, and calculates the proportion C of the remaining liquid time B to the open time A (=B/A) to determine whether or not the proportion C is not less than the predetermined ratio threshold value 90*a*. Then, if the proportion C is not less than the predetermined ratio threshold value 90*a* (step S17: YES), the routine proceeds to step S18 to perform a subroutine of the process for the discharging step. On the other hand, if the proportion C is less than the ratio threshold value 90*a* (step S17: NO), since there is no remaining liquid or the quantity of the remaining liquid is small in the gas liquid separation unit 62, the routine proceeds to step S19 without performing the process for the discharging step.

Figure 7B:
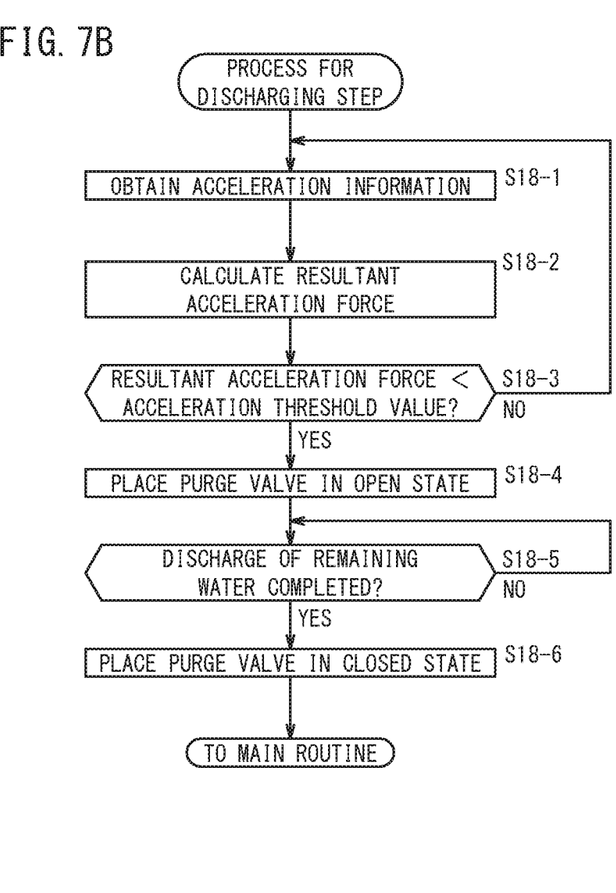
FIG. 7B is a flow chart showing the process for a discharging step in FIG. 6.

As shown in FIG. 7B, in the process for the discharging step, firstly, the control unit 22 obtains acceleration information from the acceleration sensor 80 (step S18-1: acquisition step). Then, the remaining liquid processing unit 90 calculates a resultant acceleration force (step S18-2), and compares the calculated resultant acceleration force with the acceleration threshold value 90*b* to determine whether or not the resultant acceleration force is less than the acceleration threshold value 90*b* (step S18-3). This step is performed to reliably position the remaining liquid of the gas liquid separation unit 62, in the discharge area 77. If the resultant acceleration force is not less than the acceleration threshold value 90*b* (step S18-3: NO), the routine returns to step S18-1 to repeat the same process. If the resultant acceleration force is less than the acceleration threshold value 90*b* (step S18-3: YES), the routine proceeds to step S18-4.

In step S18-4, the remaining liquid processing unit 90 outputs an opening instruction to the purge valve drive control unit 84 so that the purge valve drive control unit 84 switches the purge valve 64 from the closed state to the open state. As a result, it becomes possible to discharge the stored produced water from the gas liquid separation unit 62.

Further, when the purge valve 64 is in the open state, the water discharge monitoring unit 86 monitors the differential pressure of the purge valve 64, and determines whether or not the discharge of the remaining water has been completed (step S18-5). If discharge of the remaining water has not been completed (step S18-5: NO), step S18-5 is continued, and if discharge of the remaining water has been completed (step S18-5: YES), the routine proceeds to step S18-6. In step S18-6, the water discharge monitoring unit 86 outputs a closing instruction to the purge valve drive control unit 84, and accordingly, the purge valve drive control unit 84 switches the purge valve 64 from the open state to the closed state. As a result, the process for the discharging step is finished.

Referring back to FIG. 6, after the process for the discharging step or step S17, the discharge of the produced water from the gas liquid separation unit 62 is finished once, and the control unit 22 resets counters of the open time A and the remaining liquid time B (step S19). Then, when the control unit 22 completes its operation until step S19, the routine returns to step S10 to perform the above process flow again. Thus, the vehicle 10 can suitably reduce or remove the remaining liquid in the gas liquid separation unit 62 during traveling.

It should be noted that the present invention is not limited to the above-described embodiment. Various modifications may be made in line with the gist of the present invention. For example, in the liquid state estimation method, while discharging the produced water and/or the remaining liquid, the resultant acceleration force may be monitored (calculation of the resultant force, and comparison of the resultant force with the acceleration threshold values 88*a*, 90*b* may be performed continuously), and if the resultant force is not less than the acceleration threshold values 88*a*, 90*b*, determination of discharge completion of the produced water and/or the remaining liquid may be stopped. As a result, in the case where the position (load) of the produced water and/or the remaining liquid is present in the remaining liquid area 78, determination of discharge completion is not made, and the purge valve 64 is not placed in the closed state. Further, in the case where the position of the produced water and/or the remaining liquid is present in the discharge area 77, the control unit 22 makes determination of discharge completion. In this manner, it is possible to more suitably discharge the produced water and/or the remaining liquid.

Further, in the liquid state estimation method, in the case where it is determined that the resultant acceleration force is not less than the acceleration threshold values 88*a*, 90*b*, the purge valve 64 is switched from the open state to the closed state to stop discharging the remaining liquid, and when the resultant force becomes less than the acceleration threshold values 88*a*, 90*b*, a process of switching the purge value 64 from the closed state to the open state may be performed. In this manner, since the produced water is discharged only in the case where the produced water is in the discharge area 77, it is also possible to suitably discharge the produced water from the gas liquid separation unit 62.

Further, in the liquid state estimation method, if the remaining liquid time B, during which the resultant acceleration force is not less than the acceleration threshold value 88*a*, is measured, at the time of switching the purge valve 64 from the open state to the closed state, a process of extending the open state of the purge valve 64 based on the remaining liquid time B may be performed. The open state of the purge valve 64 may be extended to suitably discharge the remaining liquid from the gas liquid separation unit 62. Further, in the liquid state estimation method, in the case where it is estimated that there is remaining liquid in the gas liquid separation unit 62, it is not essential to take a measure by operating the purge valve 64 only. For example, in the fuel cell system 12, in the case where the remaining liquid is present, a process of pushing the remaining liquid from the gas liquid separation unit 62 into the water discharge pipe 66 may be performed by increasing the flow rate of the reactant gas flowing through the gas liquid separation unit 62. Further, in the fuel cell system 12, a code indicating that there is remaining liquid may be stored, and if there is any possibility of freezing of the remaining liquid, a measure, e.g., of performing a scavenging process before stopping driving of the vehicle 10 or during stop of driving the vehicle 10 may be taken.

The technical concepts and advantages that can be understood from the above embodiment will be described below.

According to a first aspect, provided is the fuel cell vehicle 10 equipped with the fuel cell system 12 including the gas liquid separation unit 62 configured to separate gas (hydrogen gas) and liquid (produced water), and discharge the separated liquid. The fuel cell vehicle 10 includes the acceleration detection unit (acceleration sensor 80) which detects information regarding acceleration of the fuel cell vehicle 10, and the control unit 22 which estimates the discharge state of the liquid from the gas liquid separation unit 62 based on the information regarding acceleration.

According to the above configuration, in the fuel cell vehicle 10, since acceleration applied to the liquid in the gas liquid separation unit 62 can be ascertained by using information regarding acceleration, it is possible to suitably estimate that the liquid is discharged from the gas liquid separation unit 62, or the liquid is not discharged and remains as the remaining liquid in the gas liquid separation unit 62. Therefore, when there is remaining liquid in the gas liquid separation unit 62, it becomes possible to take a suitable measure, such as discharging this remaining liquid. Accordingly, in the fuel cell vehicle 10, it becomes possible to reduce the volume of the portion of the gas liquid separation unit 62 in which the liquid is stored, and achieve reduction in the size of the gas liquid separation unit 62. In addition, since it becomes unnecessary to provide a plurality of water level sensors, etc., the production cost can be reduced.

Further, the control unit 22 calculates the resultant acceleration force applied to the liquid based on the information regarding acceleration, and determines, based on the calculated resultant acceleration force, whether the liquid is present in the discharge area 77 where the liquid is discharged from the gas liquid separation unit 62 or the liquid is present in the remaining liquid area 78 where the liquid is not discharged from the gas liquid separation unit 62. In this manner, the control unit 22 can accurately estimate whether the liquid is positioned in any of the discharge area 77 and the remaining liquid area 78.

Further, the fuel cell vehicle 10 further includes the purge valve 64 connected to the gas liquid separation unit 62 and configured to discharge the liquid in the open state and interrupt the discharge of the liquid in the closed state. The control unit 22 determines whether or not the remaining liquid remaining in the gas liquid separation unit 62 is present based on the information regarding acceleration, and places the purge valve 64 in the open state if the remaining liquid is present, and places the purge valve 64 in the closed state if the remaining liquid is not present. In this manner, in the case where the remaining liquid is present, the fuel cell vehicle 10 can discharge the remaining liquid smoothly.

Further, if the remaining liquid is present, the control unit 22 measures the remaining liquid time B during which the remaining liquid is produced, and switches opening and closing of the purge valve 64 based on the measured remaining liquid time B. In this manner, the control unit 22 can estimate how much remaining liquid is produced, and it becomes possible to more suitably discharge the remaining liquid by placing the purge valve 64 in the open state.

Further, the control unit 22 measures the open time A when the purge valve 64 is placed in the open state, and places the purge valve 64 in the open state if the proportion C of the remaining liquid time B to the open time A is not less than the predetermined ratio threshold value 90a, and places the purge valve 64 in the closed state if the proportion C of the remaining liquid time B to the open time A is less than the predetermined ratio threshold value 90a. The control unit 22 opens/closes the purge valve 64 based on the proportion C of the remaining liquid time B to the open time A. In this manner, it is possible to suppress power consumption and/or leakage of the reactant gases when the purge valve 64 is opened even though the quantity of the remaining liquid is small.

Further, if the remaining liquid is present, the control unit 22 calculates the resultant acceleration force applied to the liquid, and switches opening and closing of the purge valve 64 based on the calculated resultant acceleration force. In this manner, the control unit 22 can suitably discharge the remaining liquid through the purge valve 64 in the open state, as the state where the remaining liquid can be discharge reliably.

According to a second aspect of the present invention, provided is the liquid state estimation method for the fuel cell vehicle 10 equipped with the fuel cell system 12 including the gas liquid separation unit 62 configured to separate gas and liquid and discharge the separated liquid, the method estimating the discharge state of the liquid from the gas liquid separation unit 62. The method includes the steps of obtaining, by the control unit 22, information regarding acceleration from the acceleration detection unit (acceleration sensor 80) provided for the fuel cell vehicle 10, and estimating, by the control unit 22, the discharge state of the liquid from the gas liquid separation unit 62 based on the information regarding acceleration. In the liquid state estimation method, using the information regarding acceleration, it is possible to suitably estimate that the liquid is discharged from the gas liquid separation unit 62, or the liquid is not discharged and remains as the remaining liquid in the gas liquid separation unit 62. Accordingly, it becomes possible to take a suitable measure.

Further, the fuel cell vehicle 10 further includes the purge valve 64 connected to the gas liquid separation unit 62 and configured to discharge the liquid in the open state and interrupt the discharge of the liquid in the closed state. In the estimating step, the control unit 22 determines whether or not the remaining liquid remaining in the gas liquid separation unit 62 is present, and if the remaining liquid is present, the purge valve 64 is placed in the open state so as to perform a discharging step of discharging the remaining liquid, and if the remaining liquid is not present or the quantity of the remaining liquid is small, the purge valve 64 is placed in the closed state so as not to perform the discharging step. In the liquid state estimation method, performing the discharge step makes it possible to reduce or eliminate the states where the remaining liquid is stored in the gas liquid separation unit 62.

What is claimed is:

1. A fuel cell vehicle equipped with a fuel cell system including a gas liquid separation unit configured to separate gas and liquid and discharge the separated liquid, the fuel cell vehicle comprising:
    an acceleration detection unit programmed to detect information regarding acceleration of the fuel cell vehicle; and
    a control unit programmed to estimate a discharge state of the liquid from the gas liquid separation unit based on the information regarding acceleration, a purge valve connected to the gas liquid separation unit and configured to discharge the liquid in an open state and to interrupt the discharge of the liquid in a closed state, wherein the control unit is programmed to determine whether the remaining liquid remaining in the gas liquid separation unit is present based on the information regarding acceleration, and places the purge valve in the open state if the remaining liquid is present, and places the purge valve in the closed state if the remaining liquid is not present, and wherein if the remaining liquid is present, the control unit calculates a resultant acceleration force applied to the liquid, and switches opening and closing of the purge valve based on the calculated resultant acceleration force.

2. The fuel cell vehicle according to claim 1, wherein the control unit calculates a resultant acceleration force applied to the liquid based on the information regarding acceleration, and determines, based on the calculated resultant acceleration force, whether the liquid is present in a discharge area where the liquid is discharged from the gas liquid separation unit or the liquid is present in a remaining liquid area where the liquid is not discharged from the gas liquid separation unit.

3. The fuel cell vehicle according to claim 1, wherein if the remaining liquid is present, the control unit measures a remaining liquid time during which the remaining liquid is produced, and switches opening and closing of the purge valve based on the measured remaining liquid time.

4. The fuel cell vehicle according to claim 3, wherein the control unit measures an open time when the purge valve is placed in the open state, and places the purge valve in the open state if a proportion of the remaining liquid time to the open time is not less than a predetermined ratio threshold value, and places the purge valve in the closed state if the proportion of the remaining liquid time to the open time is less than the predetermined ratio threshold value.

5. The fuel cell vehicle according to claim 1, further comprising a water discharge monitoring unit that is programmed to monitor a differential pressure between the gas liquid separation unit and the purge valve.

6. A liquid state estimation method for a fuel cell vehicle equipped with a fuel cell system comprising:

a gas liquid separation unit configured to separate gas and liquid and discharge the separated liquid, and a purge valve connected to the gas liquid separation unit and configured to discharge the liquid in an open state and to interrupt the discharge of the liquid in a closed state, the method comprising:

obtaining, by a control unit, information regarding acceleration from an acceleration detection unit provided for the fuel cell vehicle;

estimating, by the control unit, a discharge state of the liquid from the gas liquid separation unit based on the information regarding acceleration;

determining, by the control unit, whether or not the remaining liquid remaining in the gas liquid separation unit is present based on the information regarding acceleration;

if the remaining liquid is present, placing, by the control unit, the purge valve in the open state so as to perform a discharging step of discharging the remaining liquid, and, if the remaining liquid is not present or a quantity of the remaining liquid is small, placing, by the control unit, the purge valve in the closed state so as not to perform the discharging step; and wherein if the remaining liquid is present, calculating, by the control unit, a resultant acceleration force applied to the liquid, and switching, by the control unit, opening and closing of the purge valve based on the calculated resultant acceleration force.

7. The liquid state estimation method of claim 6, further comprising:

monitoring, by a water discharge monitoring unit of the fuel cell system of the fuel cell vehicle, a differential pressure between the gas liquid separation unit and the purge valve.

* * * * *